United States Patent

Scannelli et al.

[11] Patent Number: 5,267,877
[45] Date of Patent: Dec. 7, 1993

[54] COAXIAL CONNECTOR FOR CORRUGATED CONDUIT

[75] Inventors: Anthony R. Scannelli, Stoneham; Christopher Lewis, Southboro, both of Mass.

[73] Assignee: Dynawave Incorporated, Georgetown, Mass.

[21] Appl. No.: 979,972

[22] Filed: Nov. 23, 1992

[51] Int. Cl.⁵ ............................................. H01R 13/00
[52] U.S. Cl. ...................................................... 439/584
[58] Field of Search .................................. 439/578–585

[56] References Cited

U.S. PATENT DOCUMENTS 3,671,926  6/1972  Nepovim .............................. 439/584
4,687,272  8/1987  Spinner et al. ...................... 439/583

FOREIGN PATENT DOCUMENTS 2221931  11/1973  Fed. Rep. of Germany ...... 439/583

Primary Examiner—Joseph H. McGlynn
Attorney, Agent, or Firm—John E. Toupal; Harold G. Jarcho

[57] ABSTRACT

A connector for a helically corrugated conduit and includes a coupling mechanism defining a cavity for receiving an end of a conduit having external corrugations, and a stop surface disposed within the cavity; a hollow fastener threadedly engaged with the connector mechanism and defining an engagement surface; and a collar disposed in the cavity and having internal grooves adapted to engage the external corrugations on the conduit, the collar having an inner end surface for engaging the stop surface and an outer end surface for engaging the engagement surface, and wherein circumferentially spaced apart portions of the collar are split by longitudinally extending slot means. Forcible engagement between the connector mechanism and fastener produces circumferential contraction of the collar along the slot and radially against the outer surface of the conduit.

22 Claims, 1 Drawing Sheet 5,267,877

COAXIAL CONNECTOR FOR CORRUGATED CONDUIT

BACKGROUND OF THE INVENTION

This invention relates generally to a connector for coaxial conductors and, more particularly, to a connector for a coaxial line including a corrugated outer conductor.

The interconnection of corrugated outer conductor presents unique problems. In attempts to solve those problems, there have been developed various types of connectors specially adapted for coupling with corrugated conduit conductors. Several such connectors are disclosed in the prior art which includes the following patents.

U.S. Pat. No. 3,910,673 discloses a connector in which a subassembly captivated within a backshell forces a deformable material into sealing contact with the outer corrugated surface of a corrugated conductor upon fastening the backshell to the body of the connector. Disclosed in U.S. Pat. No. 4,687,272 is a connector including a screw cap and engaged nut press a flanged end of a corrugated outer conductor against an annular contact surface on a plug socket. U.S. Pat. No. 4,824,401 discloses a connector in which a plastic ring is placed around a corrugated conduit outer conductor between a coupling ring and the metal casing. The coupling ring threadedly engages the metal casing and forces the plastic ring against the outer surface of a corrugated conduit. Disclosed in U.S. Pat. No. 4,995,832 is a connector in which a helical spring is received within the helical corrugations of a conduit. A bolt member engages the connector body and forces the spring against the conduit corrugations.

Although functioning to connect the ends of corrugated conduit, the connectors disclosed by the above patents suffer individually and collectively from a number of deficiencies including high manufacturing costs, labor intensive assembly requirements and the establishment of inadequate electrical connections.

The object of this invention, therefore, is to provide an improved connector for connecting coaxial lines with corrugated outer conductors.

SUMMARY OF THE INVENTION

The invention is a connector for helically corrugated conduit and includes a coupling mechanism defining a cavity for receiving an end of a conduit having external corrugations, and a stop surface disposed within the cavity; a hollow fastener threadedly engaged with the connector mechanism and defining an engagement surface; and a collar disposed in the cavity and having internal grooves adapted to engage the external corrugations on the conduit, the collar having an inner end surface for engaging the stop surface and an outer end surface for engaging the engagement surface, and wherein circumferentially spaced apart portions of the collar are split by longitudinally extending slot means. Forcible engagement between the connector mechanism and fastener produces circumferential contraction of the collar along the slot and radially against the outer surface of the conduit.

According to one feature of the invention, the slot means is a longitudinal slot extending the entire length of the collar. The full length slot enhances the desired circumferential contraction of the collar.

According to another feature of the invention, longitudinally spaced apart portions of the collar are split by a circumferentially extending slot, and the internal grooves form threads for engaging the corrugations. In response to engagement between the connector mechanism and the fastener, the longitudinally spaced apart portions of the collar are axially deformed to forcibly engage side surfaces of the corrugations on the conductor conduit.

According to yet another feature of the invention the circumferentially extending slot has a length of at least 180°.

According to still another feature of the invention, the circumferentially extending slot is disposed in substantially the longitudinal center of the collar. This feature further enhances axial deformation of the collar.

According to a further feature of the invention, the coupling mechanism includes a cup-shaped shell and an annular insert received thereby and defining the stop surface. The insert simplifies construction of the connector.

According to still other features of the invention, the inner end surface and the stop surface are mating annular, beveled surfaces; and the outer end surface and the engagement surface are mating annular, beveled surfaces. The beveled surfaces facilitate the application of force to the collar.

In one embodiment of the invention, the slot means includes first and second slots each extending the entire length of the collar and separating the collar into two parts. The two part collar can be used with an outer conductor conduit having non-intersecting corrugations.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
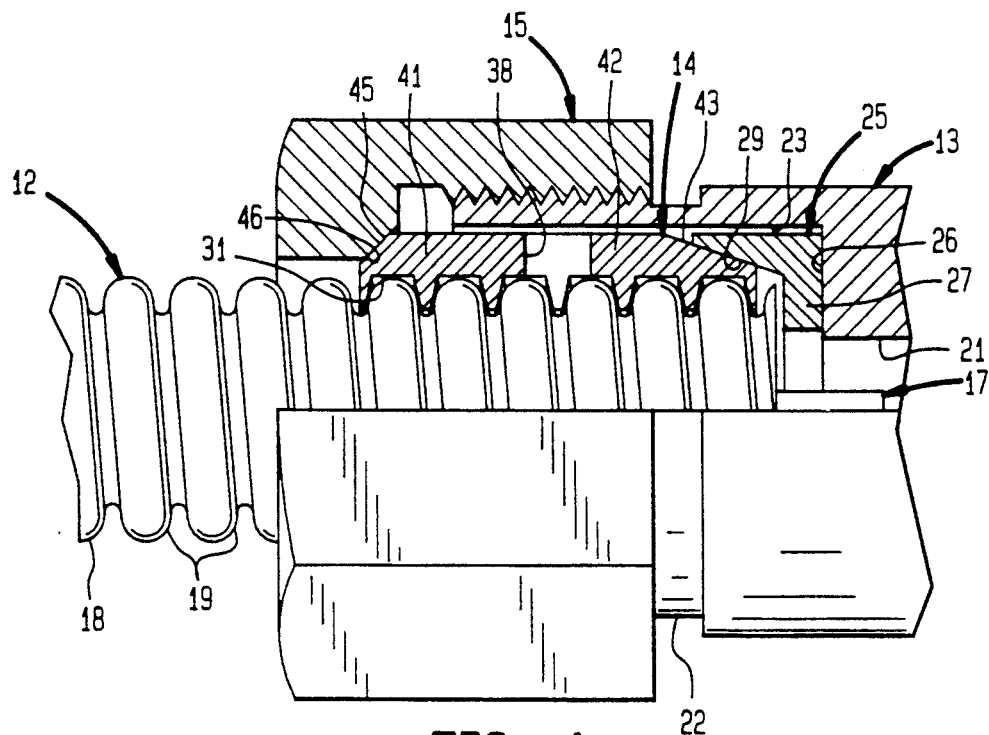
FIG. 1 is a partial longitudinal cross sectional view of a connector according to the invention.
Figure 2:
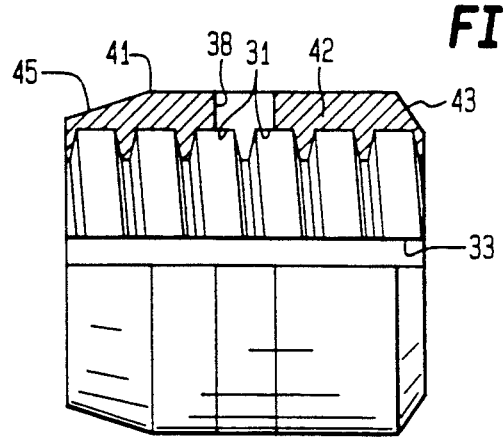
FIG. 2 is a partial longitudinal cross sectional view of a collar used in the connector shown in FIG. 1.

A connector assembly 11 includes a coaxial cable 12, a cup-shaped coupler body 13, a coupling collar 14 and a nut fastener 15. The cable 12 includes an inner conductor 17 and an outer conductor 18 formed by a conductive conduit having helical external corrugations 19. Receiving the inner conductor 17 is a central opening 21 in the coupler body 13 that functions as an outer conductor of a coaxial line.

Engaging internal threads on the nut fastener 15 are external threads on a cylindrical end portion 22 of the coupler body 13. The cylindrical end portion 22 forms a cavity 23 that receives the coupling collar 14 and a free end of the coaxial cable 12. Included in the coupler body 13 and retained within the cavity 23 is an annular insert 25 disposed between the collar 14 and an annular abutment surface 26 of the body 13 extending between the cylindrical portion 22 and the central opening 21. The insert 25 has an annular hub portion 27 that engages the abutment surface 26 and an outwardly projecting flange portion 28 having an inwardly directed beveled stop surface 29.

The coupling collar 14 has internal thread grooves 31 that engage the helical external corrugations 19 on the coaxial cable conduit 18. Extending the entire length of the collar 14 is a longitudinally extending slot 33 that splits the collar into circumferentially spaced apart portions 34, 35 that are joined in a region 36 diametrically opposite to the slot 33. Also defined by the collar 14 is a circumferentially extending slot 38 that splits the collar 14 into longitudinally spaced apart portions 41, 42. A beveled inner end surface 43 on the collar 14 engages the mating beveled stop surface 29 on the annular insert 25. Similarly, a beveled outer end surface 45 on the collar 14 engages a beveled mating engagement surface 46 formed internally on the nut fastener 15.

Figure 3:
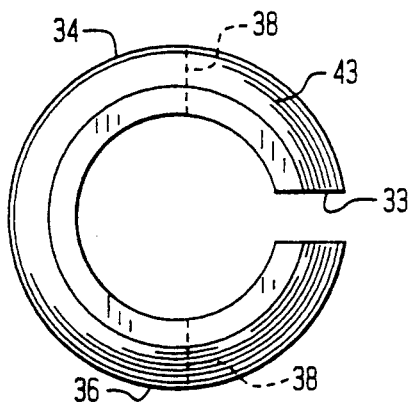
FIG. 3 is a transverse cross sectional view of the collar shown in FIG. 2.

During use of the connector assembly 11, the coupler body 13 is secured to coaxial circuity (not shown) including an outer conductor connected to the body 13 and an inner socket (not shown) electrically isolated from the body 13 and disposed to receive the inner conductor 17 of the coaxial cable 12. After passing the nut fastener 15 over the free end of the coaxial cable 12, the coupling collar 14 is turned onto the cable 12 into the position shown in FIG. 1. Next, the cable 12 and attached collar 14 are inserted into the cavity 23 of the coupler body 13 until the stop surface 29 engages the inner end surface 43. Finally, the nut fastener 15 is tightened onto the cylindrical end portion 22 of the coupler body 13 to produce forcible engagement between the abutment stop surface 29 on the insert 25 and the inner end surface 43 of the collar 14 and between the beveled engagement surface 46 on the nut 15 and the outer end surface 45 of the collar 14. The forces produced by that engagement cause a circumferential contraction of the collar 14 permitted by the longitudinally extending slot 33 and a longitudinal deformation of the collar allowed by the circumferentially extended slot 38. That longitudinal deformation is facilitated by providing the circumferentially extending slot 38 with a total length of at least 180° as shown in FIG. 3.

The circumferential contraction of the collar 14 produces radially directed forces between the engaging surfaces of the conduit 18 and the collar 14 while the longitudinal deformation of the collar 14 produces axially directed forces between the engaging side surfaces of the corrugations 19 on the conduit 18 and the grooves 31 in the collar 14. Thus, there is established between the coaxial cable 12 and the coupler body 13 an extremely secure connection that prevents relative movement therebetween. In addition, the electrically conductive collar 14 establishes a good electrical connection between the conduit 18 and the coupler body 13.

Figure 4:
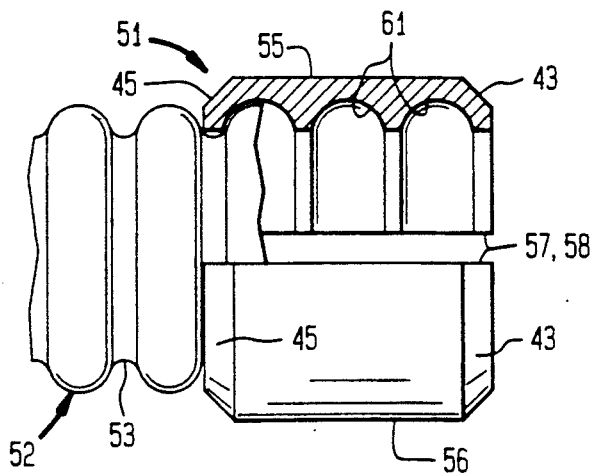
FIG. 4 is a longitudinal cross sectional view of a modified collar for use in the connector shown in FIG. 1.
Figure 5:
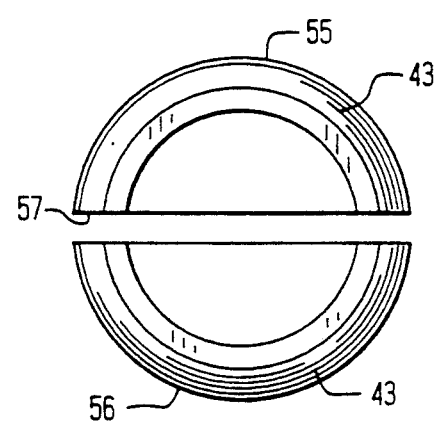
FIG. 5 is a transverse cross sectional view of the collar shown in FIG. 3.

Illustrated in FIGS. 4 and 5 is another coupling collar embodiment 51 for use with the connector assembly 11 when utilizing a coaxial cable (not shown) having an outer conductor conduit 52 with longitudinally spaced apart annular corrugation grooves 53 rather than the helically extending corrugations 19 on the conduit 18 of FIG. 1. The collar 51 is formed by two distinct, arcuately shaped parts 55, 56 separated by a longitudinal slot 57 and a second longitudinally extending slot 58. Defined internally on each of the parts 55, 56 are longitudinally spaced apart grooves 61 that mate with ridges 62 formed between the grooves 53 on the conduit 52.

The collar 51 is used in the same manner as described above for the collar 14. However, because of its two piece construction, the collar 51 can be assembled onto the free end of a non-helically corrugated conduit 52.

Obviously, many modifications and variations of the present invention are possible in light of the above teachings. It is to be understood, therefore, that the invention can be practiced otherwise than as specifically described.

What is claimed is:

1. A connector for connecting to helically corrugated conduit comprising:
   a coupling means defining a cavity for receiving an end of a conduit having external corrugations, and a stop surface disposed within said cavity;
   a hollow fastener threadedly engaged with said coupling means and defining an engagement surface; and
   a collar disposed in said cavity and having internal grooves adapted to engage the external corrugations on the conduit, said collar having an inner end surface for engaging said stop surface and an outer end surface for engaging said engagement surface, and wherein circumferentially spaced apart portions of said collar split by longitudinally extending slot means and longitudinally spaced apart portions of said collar are split by a circumferentially extending slot.

2. A connector according to claim 1 wherein said slot means comprises a longitudinal slot extending the entire length of said collar.

3. A connector according to claim 1 wherein said circumferentially extending slot intersects said longitudinally extending slot means.

4. A connector according to claim 1 wherein said internal grooves form threads for engaging the corrugations.

5. A connector according to claim 4 wherein said circumferentially extending slot has a length of at least 180°.

6. A connector according to claim 5 wherein said circumferentially extending slot is disposed in substantially the longitudinal center of said collar.

7. A connector according to claim 6 wherein said slot means comprises a longitudinal slot extending the entire length of said collar.

8. A connector according to claim 7 wherein said connector means is a coaxial connector comprising an opening for receiving an inner conductor, and an outer conductor electrically isolated from the inner conductor and electrically connected to said collar.

9. A connector according to claim 8 wherein said coupling means comprises a cup-shaped shell and an annular insert received thereby and defining said stop surface.

10. A connector according to claim 1 wherein said inner end surface and said stop surface, and said outer end surface and said engagement surface are shaped and arranged to produce on said collar radially directed forces in response to longitudinally directed forces extended between said fastener and said coupling means.

11. A connector according to claim 10 wherein said inner end surface and said stop surface are mating annular, beveled surfaces; and said outer end surface and said engagement surface are mating annular, beveled surfaces.

12. A connector assembly comprising:

a conduit having external corrugations;

a coupling means defining a cavity retaining an end of said conduit, and a stop surface disposed within said cavity;

a hollow fastener threadedly engaged with said coupling means and defining an engagement surface; and a collar disposed in said cavity and having internal grooves adapted to engage said external corrugations on said conduit, said collar having a inner end surface for engaging said stop surface and an outer end surface for engaging said engagement surface, and wherein circumferentially spaced apart portions of said collar are split by longitudinally extending slot means and longitudinally spaced apart portions of said collar are split by a circumferentially extending slot.

13. A connector according to claim 12 wherein said slot means comprises a longitudinal slot extending the entire length of said collar.

14. A connector according to claim 12 wherein said circumferentially extending slot intersects said longitudinally extending slot means.

15. A connector according to claim 12 wherein said internal grooves form threads engaging said corrugations.

16. A connector according to claim 15 wherein said circumferentially extending slot has a length of at least 180°.

17. A connector according to claim 16 wherein said circumferentially extending slot is disposed in substantially the longitudinal center of said collar.

18. A connector according to claim 17 wherein said slot means comprises a longitudinal slot extending the entire length of said collar.

19. A connector according to claim 18 wherein said connector means is a coaxial connector comprising an opening for receiving an inner conductor, and an outer conductor electrically isolated from the inner conductor and electrically connected to said collar.

20. A connector according to claim 19 wherein said coupling means comprises a cup-shaped shell and an annular insert received thereby and defining said stop surface.

21. A connector according to claim 12 wherein said inner end surface and said stop surface, and said outer end surface and said engagement surface are shaped and arranged to produce on said collar radially directed forces in response to longitudinally directed forces exerted between said fastener and said coupling means.

22. A connector according to claim 21 wherein said inner end surface and said stop surface are mating annular, beveled surfaces; and said outer end surface and said engagement surface are mating annular, beveled surfaces.

* * * * *